US012559422B2

(12) United States Patent
Xu et al.

(10) Patent No.: US 12,559,422 B2
(45) Date of Patent: Feb. 24, 2026

(54) CHEMICALLY TOUGHENED MICROCRYSTALLINE GLASS, AND PREPARATION METHOD AND APPLICATION THEREOF

(71) Applicant: Honor Device Co., Ltd., Shenzhen (CN)

(72) Inventors: Wenbin Xu, Shenzhen (CN); Qiuqun Chen, Shenzhen (CN); Minggang He, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 406 days.

(21) Appl. No.: 17/913,060

(22) PCT Filed: Apr. 28, 2022

(86) PCT No.: PCT/CN2022/090015
§ 371 (c)(1),
(2) Date: Sep. 20, 2022

(87) PCT Pub. No.: WO2023/279819
PCT Pub. Date: Jan. 12, 2023

(65) Prior Publication Data
US 2024/0217870 A1 Jul. 4, 2024

(30) Foreign Application Priority Data
Jul. 8, 2021 (CN) .......................... 202110774451.0

(51) Int. Cl.
C03C 21/00 (2006.01)
C03B 32/02 (2006.01)
C03C 10/00 (2006.01)

(52) U.S. Cl.
CPC ............ *C03C 21/002* (2013.01); *C03B 32/02* (2013.01); *C03C 10/0027* (2013.01)

(58) Field of Classification Search
CPC .... C03C 21/002; C03C 10/0027; C03B 32/02
See application file for complete search history.

(56) References Cited

U.S. PATENT DOCUMENTS 10,579,106 B2 3/2020 Demartino et al.
11,548,808 B2 1/2023 Yuan et al.
(Continued)

FOREIGN PATENT DOCUMENTS

CN 110002733 A 7/2019
CN 110510879 A 11/2019
(Continued)

OTHER PUBLICATIONS

Chen, Huajie, "Basic Experiments in Inorganic Materials Science and Engineering," Northwestern Polytechnical University Press, pp. 37-38 (Sep. 2010).
(Continued)

*Primary Examiner* — Cameron K Miller
(74) *Attorney, Agent, or Firm* — Leydig, Voit & Mayer, Ltd.

(57) ABSTRACT

A chemically toughened microcrystalline glass has a Na/Li exchange layer, and has a compressive stress layer. A depth of the compressive stress layer and a total thickness t of the chemically toughened microcrystalline glass meet the following: the depth of the compressive stress layer is 0.15 t to 0.22 t. In addition, a compressive stress intensity CS50 at a toughening depth of 50 μm in a surface layer of the chemically toughened microcrystalline glass and the total thickness t of the chemically toughened microcrystalline glass meet the following: CS50 is 130+(20 t–13)×15 Mpa to 230+(20 t–13)×15 MPa. In addition, CS50 and the depth of the compressive stress layer meet the following: CS50/(Doc–50) is 1.4 to 6.

20 Claims, 3 Drawing Sheets

Compressive stress

(56) References Cited

U.S. PATENT DOCUMENTS

| | | | |
|---|---|---|---|
| 2012/0321898 A1* | 12/2012 | Meinhardt | C03C 3/097 |
| | | | 428/410 |
| 2013/0164509 A1 | 6/2013 | Siebers et al. | |
| 2021/0024405 A1* | 1/2021 | Yu | C03C 10/0027 |
| 2021/0347682 A1 | 11/2021 | Li et al. | |
| 2022/0064054 A1 | 3/2022 | Li et al. | |
| 2022/0119306 A1* | 4/2022 | Akiba | C03C 4/18 |
| 2022/0119307 A1 | 4/2022 | Umada et al. | |
| 2023/0031267 A1 | 2/2023 | Hu et al. | |
| 2024/0025801 A1 | 1/2024 | Yu et al. | |

FOREIGN PATENT DOCUMENTS

| | | | |
|---|---|---|---|
| CN | 110627365 A | 12/2019 | |
| CN | 110734226 A | 1/2020 | |
| CN | 110845153 A | 2/2020 | |
| CN | 110872175 A | 3/2020 | |
| CN | 110894137 A | 3/2020 | |
| CN | 111018356 A | 4/2020 | |
| CN | 111320392 A | 6/2020 | |
| CN | 112592065 A | 4/2021 | |
| CN | 112608033 A | 4/2021 | |
| CN | 112919812 A | 6/2021 | |
| CN | 112939472 A | 6/2021 | |
| RU | 2055025 C1 | 2/1996 | |
| RU | 2272004 C1 | 3/2006 | |
| RU | 2715484 C2 | 2/2020 | |
| TW | 202100482 A | 1/2021 | |
| WO | 2019167850 A1 | 9/2019 | |
| WO | 2020083287 A1 | 4/2020 | |
| WO | 2020161949 A1 | 8/2020 | |
| WO | 2020261710 A1 | 12/2020 | |
| WO | 2020261711 A1 | 12/2020 | |
| WO | 2021121404 A1 | 6/2021 | |

OTHER PUBLICATIONS

Cehn, Junchi, "Study on Preparation of Sub-micron Carbonate Manganese and Manganese Phosphate," Nanchang University (Apr. 2014).

* cited by examiner

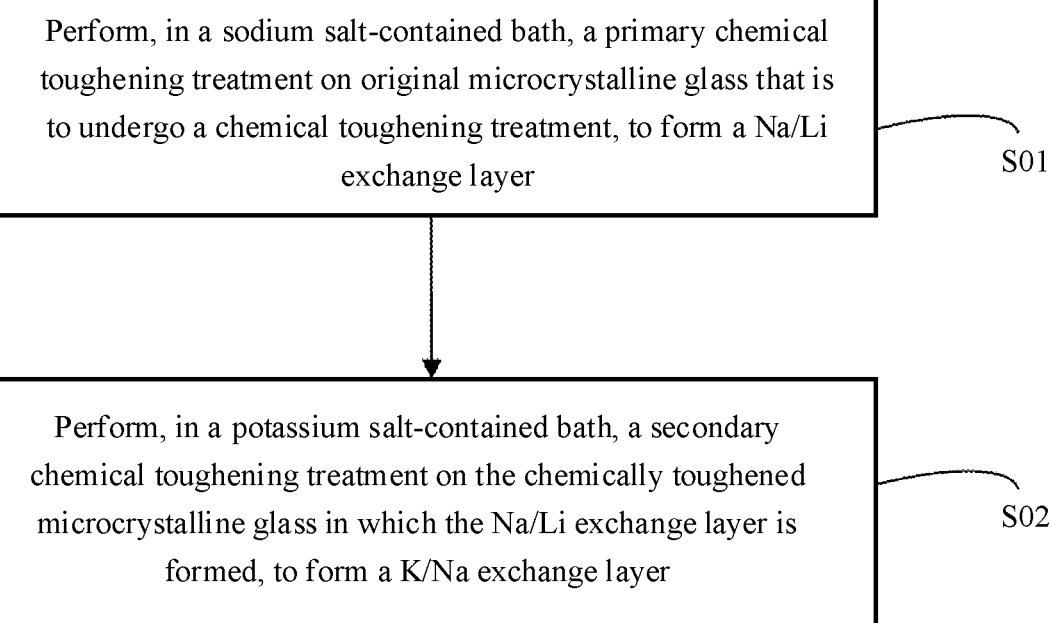

Perform, in a sodium salt-contained bath, a primary chemical toughening treatment on original microcrystalline glass that is to undergo a chemical toughening treatment, to form a Na/Li exchange layer

S01

Perform, in a potassium salt-contained bath, a secondary chemical toughening treatment on the chemically toughened microcrystalline glass in which the Na/Li exchange layer is formed, to form a K/Na exchange layer

CHEMICALLY TOUGHENED MICROCRYSTALLINE GLASS, AND PREPARATION METHOD AND APPLICATION THEREOF

CROSS-REFERENCE TO RELATED APPLICATIONS

This application is a national stage of International Application No. PCT/CN2022/090015, filed on Apr. 28, 2022, which claims priority to Chinese Patent Application No. 202110774451.0, filed on Jul. 8, 2021. The disclosures of both aforementioned applications are hereby incorporated by reference in their entireties.

TECHNICAL FIELD

This application pertains to the field of glass products technologies, and specifically relates to chemically toughened microcrystalline glass and a preparation method and application thereof.

BACKGROUND

Glass is widely used in daily life due to its characteristics such as transparency and high-temperature resistance. For example, glass is widely used in the protection apparatus field, the decoration field, and other fields. However, glass also has some disadvantages such as weak impact resistance and fragility, limiting application of glass in some fields.

With popularization of electronic products, increasingly high requirements are imposed on glass materials. For example, most screen protection materials of current smartphones are chemically toughened glass materials. In addition, with development of electronic products, rear cover materials of the electronic products are gradually replaced by glass and other materials.

At present, a cover glass material in the industry is developed from primary-toughened aluminosilicate glass to secondary-toughened lithium aluminosilicate glass. As a chemical toughening degree increases, piercing resistance to a rough ground of a cover is effectively improved. From 2016 to 2021, an iteration direction of secondary-toughened glass in the industry has been to develop towards increased deep stress, to achieve a generational improvement in grit sandpaper-based fall tests.

However, in actual application, the following disadvantages are found in cover glass materials and other aluminosilicate glass in the industry:

A secondary-toughened glass body uses lithium aluminosilicate glass, and a Young's modulus of the lithium aluminosilicate glass is usually about 80 GPa. A further improvement to a stress intensity of the lithium aluminosilicate glass is limited by a compressive stress storage capability of a substrate. An excessive compressive stress introduces a high internal tensile stress. If a tensile stress is over high, an invalid glass shard is excessively small (less than 3 mm), or cover glass explodes spontaneously. Therefore, an improvement to mechanical strength of the secondary-toughened glass is limited by a restriction on the stress intensity caused by body strength, and an improvement to fall resistance is relatively limited.

Since 2020, the cover industry has rolled out microcrystalline glass as a new development direction of cover glass. Nano-crystal inside microcrystalline glass can resist cracks and piercing, and a compressive stress introduced by an ion exchange can resist crack propagation. These two functions can improve a fall resistance capability of cover glass (for a mechanism, refer to FIG. 1). Therefore, fall resistance to a rough ground of the microcrystalline glass is greatly improved compared with that of the secondary-toughened glass.

For example, a main crystalline phase of a type of disclosed microcrystalline glass is petalite and lithium disilicate. $Li_2O$ needs to be actively introduced into toughening boiler water of the microcrystalline glass to control a concentration of sodium salt on a surface, so as to reduce a degree of precipitation of the sodium salt at a temperature of 85° C. and humidity of 85%. This crystalline phase design implements an intensity increase by means of two exchanges: a K/Na exchange and a Na/Li exchange. However, it is found from research that, the microcrystalline glass is characterized by a need of a relatively high crystallinity (greater than or equal to 85 wt %), so as to ensure excellent optical performance (a transmittance greater than or equal to 89.5%, an absolute value of a chromatic aberration b less than or equal to 0.5, and a haze less than or equal to 0.15%) of an original material. However, in a 3D hot bending forming process, a crystalline phase of this type of microcrystalline glass is susceptible to heat, and consequently optical performance deteriorates. In addition, an ion exchange of the microcrystalline glass is affected by the crystalline phase and needs a longer exchange path. Therefore, it is difficult to obtain a relatively high compressive stress by chemical toughening, and an improvement to fall resistance is still unsatisfactory.

SUMMARY

An objective of this application is to overcome disadvantages of a conventional technology, and provide chemically toughened microcrystalline glass and a preparation method and application thereof, so as to resolve technical problems that compressive stresses of existing aluminosilicate glass and existing chemically toughened microcrystalline glass are difficult to be further increased, and fall resistance is unsatisfactory.

To implement the foregoing application objective, according to one aspect of embodiments of this application, chemically toughened microcrystalline glass is provided. In this embodiment of this application, the chemically toughened microcrystalline glass has a Na/Li exchange layer, and a depth Doc of compressive stress layer of the chemically toughened microcrystalline glass is 0.15 t to 0.22 t. A compressive stress intensity CS50 at a toughening depth of 50 μm in a surface layer of the chemically toughened microcrystalline glass is 130+(20 t−13)×15 Mpa to 230+(20 t−13)×15 MPa. CS50 and Doc meet the following: CS50/ (Doc−50) is 1.4 to 6, in a unit of Mpa/μm; and t is a total thickness of the chemically toughened microcrystalline glass.

The chemically toughened microcrystalline glass in this embodiment of this application has a specific depth of compressive stress layer, a specific compressive stress intensity, and a relationship between the depth of compressive stress layer and the compressive stress intensity. The chemically toughened microcrystalline glass is endowed with a relatively high compressive stress and a stress intensity much higher than those of existing aluminosilicate glass and microcrystalline glass, and therefore can resist crack propagation. Therefore, in this embodiment of this application, piercing resistance to a rough ground of the chemically toughened microcrystalline glass is significantly improved, and a height of a rough ground-based fall test is higher than those of the existing aluminosilicate glass and microcrystalline glass.

Optionally, when the chemically toughened microcrystalline glass is squeezed by a metal compression bar with a 10 mm diameter round head and is crushed, an average size of longest sides of shards is greater than or equal to 5 mm.

Optionally, when a thickness is 0.6 mm, a height of a grit sandpaper-based fall test for the chemically toughened microcrystalline glass is greater than or equal to 1.5 m.

Optionally, when the chemically toughened microcrystalline glass is stored in an environment with a temperature of 85° C. and humidity of 85% for 72 h, no sodium salt is precipitated on an outer surface of the chemically toughened microcrystalline glass.

Optionally, when the thickness of the chemically toughened microcrystalline glass is less than or equal to 0.8 mm, an average transmittance of light at a wavelength of 400 nm to 940 nm is greater than or equal to 89.5%, a difference between a single-point transmittance at a wavelength of 550 nm and that at a wavelength of 400 nm is less than 1%, an absolute value of a color coordinate b is less than or equal to 0.4, and a haze is less than or equal to 0.15%.

On the basis that the chemically toughened microcrystalline glass has the depth of compressive stress layer, the compressive stress intensity, and the relationship between the depth of compressive stress layer and the compressive stress intensity, the chemically toughened microcrystalline glass has excellent piercing resistance to a rough ground, a high fall-resistance height, and good stability of heat and humidity resistance. In addition, the chemically toughened microcrystalline glass has good optical performance such as good light transmission.

Optionally, a main crystalline phase of original microcrystalline glass that is used to form the chemically toughened microcrystalline glass is either of lithium metasilicate and a R-quartz solid solution, a mass fraction of the contained total crystalline phase is 35% to 75%, and a total content of a secondary crystalline phase is less than 5%. Through control on a type of the main crystalline phase and a content of each crystalline phase of the original microcrystalline glass, the Na/Li exchange layer included in the chemically toughened microcrystalline glass can be effectively prevented from adverse impact of Li, and a CS50 range can be effectively controlled, thereby further improving piercing resistance to a rough ground of the chemically toughened microcrystalline glass. In addition, impact resistance and optical performance such as light transmission of the chemically toughened microcrystalline glass can be improved.

Further, the original microcrystalline glass includes main composition and a nucleating agent. The main composition includes $SiO_2$, $Al_2O_3$, $B_2O_3$, $Li_2O$, $Na_2O$, and $K_2O$, and meets the following: a content of $SiO_2+Al_2O_3+B_2O_3$ is 58-85 mol %, and a content of $Li_2O+Na_2O+K_2O$ is 10-32 mol %. The nucleating agent includes $TiO_2$, $P_2O_5$, and $ZrO_2$, and meets the following: a content of $TiO_2+P_2O_5+ZrO_2$ is 2-8 mol %. These components of the original microcrystalline glass endow the original microcrystalline glass and the chemically toughened microcrystalline glass with the foregoing type of the main crystalline phase and the content of each crystalline phase, so as to improve the piercing resistance to a rough ground of the chemically toughened microcrystalline glass and improve the optical performance such as light transmission of the chemically toughened microcrystalline glass.

Further, a glass matrix of the original microcrystalline glass is prepared by using a melting and casting method or a calendering method.

Further, the glass matrix of the original microcrystalline glass is heat-treated in the following two steps:

heat treatment step 1: a temperature is 500° C. to 600° C., and a treatment time is 0.1 h to 10 h; and heat treatment step 2: a temperature is 640° C. to 800° C., and a treatment time is 0.1 h to 10 h.

The two-step heat treatment is performed on the glass matrix of the original microcrystalline glass, so that the formed original microcrystalline glass obtains a required main crystalline phase, and contents of the main crystalline phase and other secondary crystalline phases can be adjusted, thereby improving piercing resistance to a rough ground and optical performance of the chemically toughened microcrystalline glass.

Further, a Young's modulus of the chemically toughened microcrystalline glass is greater than or equal to 95 GPa. Based on the type of the main crystalline phase and the content of each crystalline phase of the original microcrystalline glass of the chemically toughened microcrystalline glass, the chemically toughened microcrystalline glass is endowed with a high Young's modulus, so that the chemically toughened microcrystalline glass is endowed with storage space that can accommodate a greater compressive stress, providing a condition for increasing the compressive stress of the chemically toughened microcrystalline glass.

Optionally, the surface layer of the chemically toughened microcrystalline glass further has a K/Na exchange layer. Introducing the K/Na exchange layer (potassium layer) further improves the impact resistance of the chemically toughened microcrystalline glass, and helps maintain fall resistance to a rough ground of the chemically toughened microcrystalline glass.

Further, a thickness of the K/Na exchange layer is less than or equal to 3 μm. Through control on the thickness of the K/Na exchange layer (potassium layer), the impact resistance and the fall resistance to a rough ground of the chemically toughened microcrystalline glass can be further improved. Based on the depth of compressive stress layer, the compressive stress intensity, and the relationship between the depth of compressive stress layer and the compressive stress intensity, a requirement for the thickness of the K/Na exchange layer can be effectively reduced.

Optionally, the chemically toughened microcrystalline glass is any one of chemically toughened microcrystalline glass with 2D morphology, chemically toughened microcrystalline glass with 2.5D morphology, or chemically toughened microcrystalline glass with 3D morphology. Because the chemically toughened microcrystalline glass has the foregoing excellent piercing resistance to a rough ground and optical performance, the chemically toughened microcrystalline glass may be any one of the chemically toughened microcrystalline glass with 2D morphology, the chemically toughened microcrystalline glass with 2.5D morphology, or the chemically toughened microcrystalline glass with 3D morphology. This expands an application scope of the chemically toughened microcrystalline glass, and improves quality and performance stability of corresponding products.

Further, when the chemically toughened microcrystalline glass is the chemically toughened microcrystalline glass with 2D morphology and/or the chemically toughened microcrystalline glass with 2.5D morphology, the absolute value of the color coordinate b is less than or equal to 0.3 and the haze is less than or equal to 0.14% for the chemically toughened microcrystalline glass with 2D morphology and/or the chemically toughened microcrystalline glass with 2.5D morphology.

When the chemically toughened microcrystalline glass is the chemically toughened microcrystalline glass with 2D morphology or the chemically toughened microcrystalline glass with 2.5D morphology, the chemically toughened microcrystalline glass has excellent piercing resistance to a rough ground and excellent light transmission.

Further, when the chemically toughened microcrystalline glass is the chemically toughened microcrystalline glass with 3D morphology, a long-side bend angle of the chemically toughened microcrystalline glass with 3D morphology is 15° to 89°.

Further, the absolute value of the color coordinate b is less than or equal to 0.4 and the haze is less than or equal to 0.15% for the chemically toughened microcrystalline glass with 3D morphology.

As the chemically toughened microcrystalline glass with 3D morphology, the chemically toughened microcrystalline glass still has excellent piercing resistance to a rough ground and excellent light transmission.

According to another aspect of the embodiments of this application, a preparation method of the chemically toughened microcrystalline glass in the foregoing embodiment of this application is provided. The preparation method of the chemically toughened microcrystalline glass in this embodiment of this application includes the following step:

performing, in a sodium salt-contained bath, a primary chemical toughening treatment on original microcrystalline glass that is to undergo a chemical toughening treatment, to form a Na/Li exchange layer.

According to the preparation method of the chemically toughened microcrystalline glass in this application, the primary chemical toughening treatment is performed on the original microcrystalline glass in the sodium salt-contained bath, so that the Na/Li exchange layer is formed in a surface layer of the original microcrystalline glass. In addition, through control on the primary chemical toughening treatment, the chemically toughened microcrystalline glass formed by chemical toughening can have the depth of compressive stress layer, the compressive stress intensity CS50 range, and the relationship therebetween of the chemically toughened microcrystalline glass in the foregoing embodiment of this application. In this way, the prepared chemically toughened microcrystalline glass is endowed with a relatively high compressive stress and a greatly improved stress intensity, can resist crack propagation, and has excellent piercing resistance to a rough ground. In addition, in this application, a chemical toughening condition for the preparation method of the chemically toughened microcrystalline glass in this application is easy to control, so that the prepared chemically toughened microcrystalline glass has stable performance, high efficiency, and reduced preparation costs.

Optionally, the sodium-contained salt bath includes $NaNO_3$ or a salt mixture of $NaNO_3$ and $KNO_3$, and in the salt mixture of $NaNO_3$ and $KNO_3$, a content of $NaNO_3$ is greater than or equal to 50 wt %.

Optionally, in the primary chemical toughening treatment, a temperature is 380° C. to 450° C., and a toughening time is 0.5 h to 6 h.

Through control on a type of the sodium-contained salt bath, the content of $NaNO_3$, and the primary chemical toughening treatment, an effect of the chemical toughening treatment on the original microcrystalline glass is improved, and the depth of compressive stress layer and the compressive stress intensity CS50 range of the formed chemically toughened microcrystalline glass are optimized, so that the compressive stress of the chemically toughened microcrystalline glass is increased, and piercing resistance to a rough ground and light transmission performance of the chemically toughened microcrystalline glass are improved.

Optionally, after the primary chemical toughening treatment, the method further includes: performing, in a potassium salt-contained bath, a secondary chemical toughening treatment on the chemically toughened microcrystalline glass in which the Na/Li exchange layer is formed, to form a K/Na exchange layer. By further performing the secondary chemical toughening treatment on the chemically toughened microcrystalline glass that is formed by the primary chemical toughening treatment, the K/Na exchange layer is formed in the surface layer of the formed chemically toughened microcrystalline glass, so that impact resistance and fall resistance to a rough ground of the chemically toughened microcrystalline glass are further improved.

Further, the potassium-contained salt bath includes $KNO_3$ or a salt mixture of $NaNO_3$ and $KNO_3$, and in the salt mixture of $NaNO_3$ and $KNO_3$, a content of $KNO_3$ is greater than or equal to 80 wt %.

Further, in the secondary chemical toughening treatment, a temperature is 380° C. to 450° C., and a toughening time is 0.2 h to 1 h.

Through control on a type of the potassium-contained salt bath, the content of $KNO_3$, and the secondary chemical toughening treatment, an effect of the secondary chemical toughening treatment is improved, and impact resistance and fall resistance to a rough ground of the chemically toughened microcrystalline glass are further improved.

Optionally, before the performing, in a sodium salt-contained bath, a primary chemical toughening treatment on original microcrystalline glass that is to undergo a chemical toughening treatment, the method further includes a step of performing the following hot bending treatment on the original microcrystalline glass:

The hot bending treatment is performed on the original microcrystalline glass at 650° C. to 750° C. to form 3D original microcrystalline glass. A time for each hot bending work station is 30 s to 120 s, and a pressure for the hot bending treatment is 0.1 MPa to 0.9 MPa.

The 3D original microcrystalline glass is formed by performing the hot bending treatment on the original microcrystalline glass, so that after the primary chemical toughening treatment or the further secondary chemical toughening treatment, chemically toughened microcrystalline glass with 3D morphology can be formed, and it is ensured that the chemically toughened microcrystalline glass with 3D morphology has a high compressive stress, excellent piercing resistance to a rough ground, and excellent light transmission performance.

According to another aspect of the embodiments of this application, an electronic device is provided. The electronic device in this embodiment of this application includes a glass component, and the glass component is the chemically toughened microcrystalline glass in the forgoing embodiment of this application, or chemically toughened microcrystalline glass prepared by using the preparation method of the chemically toughened microcrystalline glass in the forgoing embodiment of this application. The chemically toughened microcrystalline glass in this embodiment of this application has the foregoing excellent piercing resistance to a rough ground and optical performance, or further has excellent impact resistance. Therefore, the glass component is endowed with excellent fall and crash resistance and high strength. In this way, the electronic device in this embodiment of this application is endowed with excellent fall and crash resistance and impact resistance, and quality and working performance stability of the electronic device are high.

Further, the glass component includes at least one of a display cover, a protection cover, or a protection screen. The glass component has good light transmission, strong protection, and fall and crash resistance, and further has high strength, good display performance, and stability.

BRIEF DESCRIPTION OF DRAWINGS

FIG. 3 is a schematic flowchart of a preparation method of chemically toughened microcrystalline glass according to an embodiment of this application.

DESCRIPTION OF EMBODIMENTS

Figure 1:
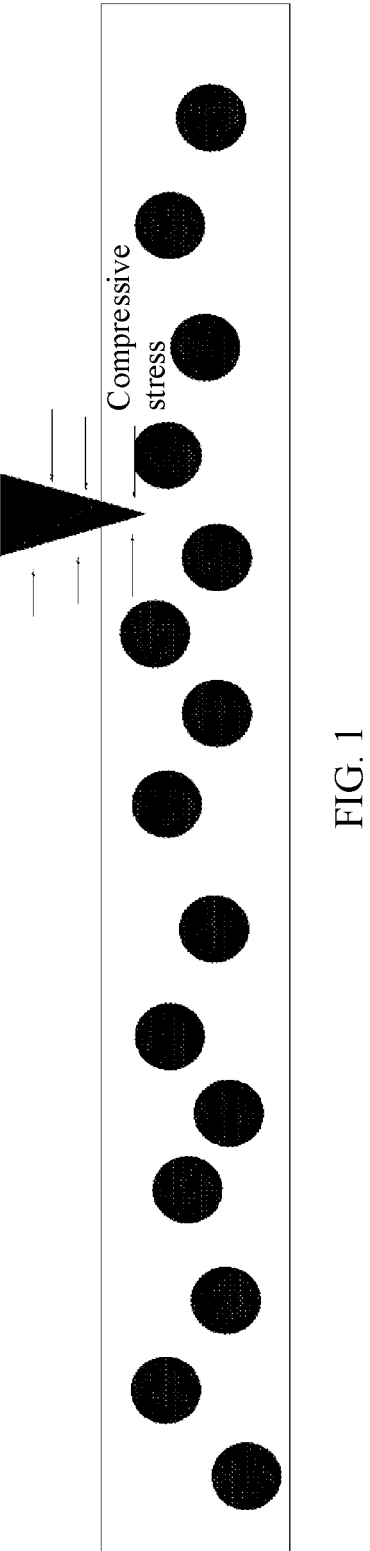
FIG. 1 is a schematic diagram of a piercing resistance mechanism of crystalline glass.

To make to-be-resolved technical problems, technical solutions, and beneficial effects of this application clearer, the following further describes this application in detail with reference to embodiments. It should be understood that specific embodiments described herein are merely used to explain this application, and are not used to limit this application.

In the description of this application, it should be understood that the term "and/or" describes an association relationship of associated objects and represents that three relationships may exist. For example, A and/or B may represent the following three cases: Only A exists, both A and B exist, and only B exists. A and B may be singular or plural. The character "/" generally represents an "or" relationship between the associated objects.

In this application, "at least one" means one or more, and "a plurality of" means two or more. "At least one of the following items" or a similar expression means any combination of these items, including a single item or any combination of plural items. For example, "at least one of a, b, or c", or "at least one of a, b, and c" can both represent: a, b, c, a-b (that is, a and b), a-c, b-c, or a-b-c, where there may be one or more of a, b, and c.

The terms used in the embodiments of this application are merely used for an objective of describing a specific embodiment, and is not intended to limit this application. The terms "a", "said", and "the" of singular forms used in the embodiments and the appended claims of this application are also intended to include plural forms, unless otherwise specified in the context clearly.

In the embodiments of this application, the term "and/or" describes an association relationship of associated objects and represents that three relationships may exist. For example, A and/or B may represent the following three cases: Only A exists, both A and B exist, and only B exists. A and B may be singular or plural. The character "/" generally represents an "or" relationship between the associated objects.

It should be understood that, in various embodiments of this application, a sequence number of each of the foregoing processes does not mean a sequence of execution. Some or all of the steps may be performed in parallel or performed in sequence. The sequence of execution of the processes should be determined based on functions and internal logic of the processes, and no limitation should be imposed on an implementation process of the embodiments of this application.

A weight of a related component mentioned in the specification of the embodiments of this application may not only refer to a specific content of each component, but also may represent a proportional relationship between weights of components. Therefore, if the weight of the related component is scaled up or scaled down by proportion according to the content of the related component in the specification of the embodiments of this application, the weight of the related component falls within the scope disclosed in the specification of the embodiments of this application. Specifically, mass described in the specification of the embodiments of this application may be in a mass unit well-known in the chemical engineering field, such as μg, mg, g, or kg.

The terms "first" and "second" are only used for descriptive purposes to distinguish between objects such as substances from each other, and cannot be understood as indicating or implying relative importance or implying a quantity of indicated technical features. For example, without departing from the scope of the embodiments of this application, "a first XX" may also be referred to as "a second XX", similarly, "a second XX" may also be referred to as "a first XX". Therefore, a feature defined as by "first" or "second" may explicitly or implicitly include one or more of the features.

The following are explanations of relevant special names:

Original microcrystalline glass: microcrystalline glass that is not toughened.

Chemically toughened microcrystalline glass: chemically tempered microcrystalline glass treated by using a high-temperature ion exchange process. In high-temperature molten salt, large alkali metal ions replace small alkali metal ions in glass, so as to generate a volume difference between exchanged ions and generate compressive stresses from high to low in a surface layer of original glass, thereby preventing and delaying propagation of glass micro-cracks, and achieving an objective of improving mechanical strength of the glass.

Depth of compressive stress layer (Doc): a depth of compressive stress layer of chemically toughened microcrystalline glass.

Compressive stress value (CS50) at a depth of 50 μm in a surface layer of chemically toughened microcrystalline glass: represents a compressive stress value at the depth of 50 μm in the surface layer of the chemically toughened microcrystalline glass.

Na/Li exchange layer: refers to a sodium-contained layer in which some lithium ions are replaced by sodium ions in chemically toughened microcrystalline glass.

K/Na exchange layer: refers to a potassium-contained layer in which some sodium ions are replaced by potassium ions in chemically toughened microcrystalline glass.

Sodium-lithium ion exchange: In chemical toughening, sodium ions in a salt bath replace lithium ions in glass.

Potassium-sodium ion exchange: In chemical toughening, potassium ions in a salt bath replace sodium ions in glass.

Figure 2:
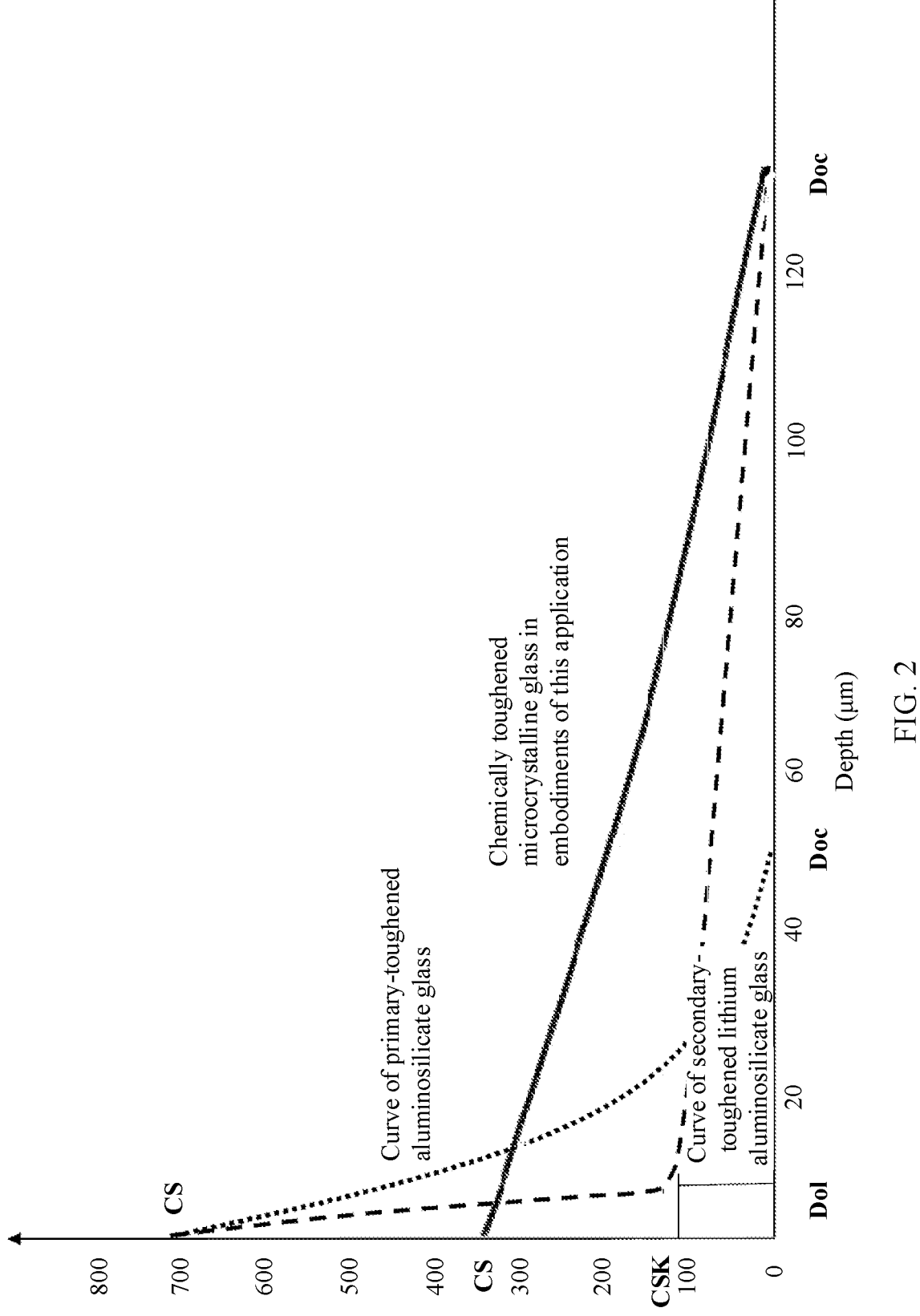
FIG. 2 is a diagram of stress curves of existing primary-toughened aluminosilicate glass, existing secondary-toughened lithium aluminosilicate glass, and chemically toughened microcrystalline glass according to an embodiment of this application.

According to one aspect, an embodiment of this application provides chemically toughened microcrystalline glass. In this embodiment of this application, the chemically toughened microcrystalline glass has a Na/Li exchange layer and a compressive stress layer. Measurements show that, a stress curve of the chemically toughened microcrystalline glass in this embodiment of this application is shown in FIG. 2, and a depth of compressive stress layer and a compressive stress intensity of the chemically toughened microcrystalline glass have at least the following characteristics 1 to 3:

1. The depth Doc of compressive stress layer of the chemically toughened microcrystalline glass and a total thickness of the chemically toughened microcrystalline glass meet a relationship shown in the following formula 1-1:

$$Doc = 0.15 \ t - 0.22 \ t. \qquad (1\text{--}1)$$

2. The compressive stress intensity in a surface layer of the chemically toughened microcrystalline glass meets a relationship shown in the following formula 1-2.

A compressive stress intensity CS50 at a toughening depth of 50 μm in the surface layer of the chemically toughened microcrystalline glass meets the relationship shown in the following formula 1-2:

$$CS50 = 130 + (20 \ t - 13) \times 15 \ \text{Mpa to } 230 + (20 \ t - 13) \times 15 \ \text{MPa.} \qquad (1\text{--}2)$$

3. A relationship between the compressive stress intensity in the surface layer and the depth Doc of compressive stress layer of the chemically toughened microcrystalline glass meets the following formula 1-3:

$$CS50/(Doc - 50) = 1.4 \ \text{to } 6, \ \text{in a unit of } \text{MPa/μm.} \qquad (1\text{--}3)$$

In formula 1-1 and formula 1-2, t is the total thickness of the chemically toughened microcrystalline glass. Therefore, t is a positive number greater than 0, and a unit of t may be mm. In this embodiment, t, namely, the total thickness of the chemically toughened microcrystalline glass in this embodiment of this application, is 0.3 mm to 0.8 mm.

The toughening depth of 50 μm in the surface layer related to formula 1-2 refers to an area at an internal depth of 50 μm in a direction from a surface to an interior of the chemically toughened microcrystalline glass. In an experiment process, it is found that when CS50 of the chemically toughened microcrystalline glass in this embodiment of this application is excessively low, a capability of the chemically toughened microcrystalline glass such as piercing resistance to a rough ground is reduced, and reliability is affected; when CS50 is over high, broken shards of the chemically toughened microcrystalline glass are excessively small.

In addition, for existing primary-toughened aluminosilicate glass (main composition is as follows: $SiO_2 + Al_2O_3 + B_2O_3 + P_2O_5 = 75\text{-}85$ mol %, and $Na_2O + K_2O = 10\text{-}16$ mol %, without including $Li_2O$; and in a toughening process of this glass, pure $KNO_3$ is usually used for toughening at 380° C. 460° C. for 1 h 10 h) shown in FIG. 2, a CS of the primary-toughened aluminosilicate glass is greater than or equal to 700 MPa, CS50 is approximately equal to 0, and a depth of a toughening layer (namely, a K/Na exchange layer) is 0.04 t to 0.09 t. For existing secondary-toughened lithium aluminosilicate glass (main composition is as follows: $SiO_2 + Al_2O_3 + B_2O_3 + P_2O_5 = 75\text{-}85$ mol %, and $Li_2O + Na_2O + K_2O = 10\text{-}20$ mol %, and a secondary toughening process is usually used: pure $NaNO_3$ or a salt mixture of $NaNO_3/KNO_3$ is used for primary toughening, and a toughening temperature is 380° C. to 450° C.; and pure $KNO_3$ or a salt mixture of $NaNO_3/KNO_3$ is used for secondary toughening), a CS of the secondary-toughened lithium aluminosilicate glass is greater than or equal to 700 MPa, a toughening depth Dol of a potassium layer is greater than or equal to 5 μm, CS50 is less than 130+(20 t–13)×15 MPa, and a toughening depth Doc of compressive stress layer is greater than or equal to 0.18 t.

Based on the foregoing description that the chemically toughened microcrystalline glass in this embodiment of this application has a specific depth of compressive stress layer, a specific compressive stress intensity, and a relationship between the depth of compressive stress layer and the compressive stress intensity, compared with the existing primary-toughened aluminosilicate glass and secondary-toughened lithium aluminosilicate glass, the chemically toughened microcrystalline glass in this embodiment of this application has a relatively high compressive stress and a stress intensity much higher than those of the existing aluminosilicate glass and microcrystalline glass, and therefore can resist crack propagation. Compared with common toughened glass in a current life scenario (for example, a depth of piercing by a rough ground that leads to a common failure of a current mobile phone in a life scenario is usually 40-70 μm), the chemically toughened microcrystalline glass in this embodiment of this application is greatly improved in term of piercing resistance to a rough ground, and a height of a rough ground-based fall test is higher than those of the existing aluminosilicate glass and microcrystalline glass. In FIG. 2, a curve of the primary-toughened aluminosilicate glass (with a K/Na exchange) is obtained through a test performed by a common surface stress test device FSM-6000LEUV in the industry, a curve of the secondary-toughened lithium aluminosilicate glass (with both K/Na and Na/Li exchanges) is obtained by synthesis through fitting tests performed by a surface stress test device FSM-6000LEUV in the industry and Scattered Light Photoelastic Stress Meter SLP2000, and a curve of the chemically toughened microcrystalline glass in this application is obtained through a test performed by using the SLP2000.

According to a further measurement, the chemically toughened microcrystalline glass in this embodiment of this application further has the following related mechanical performance and optical performance:

In this embodiment, when the chemically toughened microcrystalline glass is squeezed by using a metal compression bar with a 10 mm diameter round head and is crushed, an average size of longest sides of shards is greater than or equal to 5 mm. Therefore, the chemically toughened microcrystalline glass has a proper internal tensile stress and strong piercing resistance to a rough ground, thereby avoiding a risk of spontaneous explosion.

In this embodiment, when a thickness is 0.6 mm, a height of a grit sandpaper-based fall test for the chemically toughened microcrystalline glass is greater than or equal to 1.5 m. This reflects excellent fall resistance of the chemically toughened microcrystalline glass. The height data of the grit sandpaper-based fall test is obtained through a test in a scenario with 180 #grit sandpaper/a 200 g load. Specifically, a to-be-tested plane of the chemically toughened microcrystalline glass in this application is placed by facing downward, and the other surface carries a standard 200 g load. The glass is dropped starting from a height of 0.5 m, and an appearance of the glass is checked for every drop. If there is no problem, the height is raised by 0.1 m. The test is performed repeatedly until the glass is broken, and a failure height is recorded.

In this embodiment, when the chemically toughened microcrystalline glass is stored in an environment with a temperature of 85° C. and humidity of 85% for 72 h, no sodium salt is precipitated on an outer surface of the chemically toughened microcrystalline glass. This reflects excellent stability of heat and humidity resistance of the chemically toughened microcrystalline glass.

In this embodiment, when the thickness of the chemically toughened microcrystalline glass is less than or equal to 0.8 mm, an average transmittance of light at a wavelength of 400 nm to 940 nm is greater than or equal to 89.5%, a difference between a single-point transmittance at a wavelength of 550 nm and that at a wavelength of 400 nm is less than 1%, an absolute value of a color coordinate b is less than or equal to 0.4, and a haze is less than or equal to 0.15%. This reflects excellent optical performance such as light transmission of the chemically toughened microcrystalline glass.

Therefore, on the basis that the chemically toughened microcrystalline glass has the depth of compressive stress layer, the compressive stress intensity, and the relationship between the depth of compressive stress layer and the compressive stress intensity, the chemically toughened microcrystalline glass has a high compressive stress intensity, excellent piercing resistance to a rough ground, and a high fall-resistance height, as described in the following Table 1. In addition, the chemically toughened microcrystalline glass has excellent stability of heat and humidity resistance and good optical performance such as light transmission.

In this embodiment, a main crystalline phase of original microcrystalline glass that is used to form the chemically toughened microcrystalline glass is either of lithium metasilicate and a β-quartz solid solution, a mass fraction of the contained total crystalline phase is 35% to 75%, and a total content of a secondary crystalline phase is less than 5%. Through control on a type of the main crystalline phase and a content of each crystalline phase of the original microcrystalline glass, the Na/Li exchange layer included in the chemically toughened microcrystalline glass can be effectively prevented from adverse impact of Li, and a CS50 range can be effectively controlled, thereby further improving piercing resistance to a rough ground of the chemically toughened microcrystalline glass. In addition, optical performance such as light transmission of the chemically toughened microcrystalline glass can be further improved.

In some embodiments, the original microcrystalline glass includes main composition and a nucleating agent. The main composition includes $SiO_2$, $Al_2O_3$, $B_2O_3$, $Li_2O$, $Na_2O$, and $K_2O$, and meets the following: a content of $SiO_2+Al_2O_3+B_2O_3$ is 58-85 mol %, and a content of $Li_2O+Na_2O+K_2O$ is 10-32 mol %. The nucleating agent includes $TiO_2$, $P_2O_5$, and $ZrO_2$, and meets the following: a content of $TiO_2+P_2O_5+ZrO_2$ is 2-8 mol %. These components of the original microcrystalline glass endow the original microcrystalline glass and the chemically toughened microcrystalline glass with the foregoing type of the main crystalline phase and the content of each crystalline phase, so as to improve the piercing resistance to a rough ground of the chemically toughened microcrystalline glass and improve the optical performance such as light transmission of the chemically toughened microcrystalline glass.

In this embodiment, a glass matrix of the original microcrystalline glass may be prepared by using a melting and casting method or a calendering method. In some embodiments, the glass matrix of the original microcrystalline glass is heat-treated in the following two steps:

heat treatment step 1: a temperature is 500° C. to 600° C., and a treatment time is 0.1 h to 10 h; and heat treatment step 2: a temperature is 640° C. to 800° C., and a treatment time is 0.1 h to 10 h.

The two-step heat treatment is performed on the glass matrix of the original microcrystalline glass, so that the formed original microcrystalline glass obtains a required main crystalline phase, and contents of the main crystalline phase and other secondary crystalline phases can be adjusted, thereby improving piercing resistance to a rough ground and optical performance of the chemically toughened microcrystalline glass.

Due to the type of the main crystalline phase and the content of each crystalline phase of the original microcrystalline glass, tests show that the original microcrystalline glass further has excellent mechanical performance such as a Young's modulus and excellent optical performance such as light transmission.

For example, in this embodiment, when a thickness of the original microcrystalline glass is less than or equal to 0.8 mm, an average transmittance of light at a wavelength of 400 nm to 940 nm is greater than or equal to 89.5%, a difference between a single-point transmittance at a wavelength of 550 nm and that at a wavelength of 400 nm is less than 1%, the absolute value of the color coordinate b is less than or equal to 0.3, and the haze is less than or equal to 0.14%. Through control on the type of the main crystalline phase and the content of each crystalline phase of the original microcrystalline glass, the original microcrystalline glass has good optical performance such as light transmission, and has stable optical performance.

In this embodiment, a Young's modulus of the original microcrystalline glass is greater than or equal to 95 GPa. Based on the type of the main crystalline phase and the content of each crystalline phase of the original microcrystalline glass, the original microcrystalline glass is endowed with the high Young's modulus, so that the chemically toughened microcrystalline glass is endowed with a high Young's modulus, for example, the high Young's modulus of the chemically toughened microcrystalline glass is greater than or equal to 95 GPa. In this way, the chemically toughened microcrystalline glass is endowed with storage space that can accommodate a greater compressive stress, providing a condition for increasing the compressive stress of the chemically toughened microcrystalline glass. In addition, the original microcrystalline glass and the chemically toughened microcrystalline glass are endowed with high impact resistance. For example, tests shows that, the chemically toughened microcrystalline glass can resist impact about 25-30 GPa higher than that of the existing aluminosilicate glass, thereby effectively lowering a requirement and dependence of the chemically toughened microcrystalline glass on a K/Na exchange layer.

In this embodiment, the surface layer of the chemically toughened microcrystalline glass further has a K/Na exchange layer. The K/Na exchange layer is further formed in the surface layer of the chemically toughened microcrystalline glass, that is, a potassium layer is added in the surface layer of the chemically toughened microcrystalline glass. On the basis that the chemically toughened microcrystalline glass has high piercing resistance to a rough ground, fall resistance to a rough ground of the chemically toughened microcrystalline glass is further improved, and impact resistance of the chemically toughened microcrystalline glass is further improved.

In addition, on the basis that the chemically toughened microcrystalline glass in this embodiment of this application has a high Young's modulus, for example, the Young's modulus is greater than or equal to 95 GPa, and the high Young's modulus supports relatively good impact resistance, thereby effectively lowering dependence on the K/Na exchange layer. According to the comparison between the stress curve and the curve of the existing primary-toughened aluminosilicate glass shown in FIG. 2, the chemically toughened microcrystalline glass in this embodiment of this application does not need a relatively large K/Na exchange layer. For example, in this embodiment, a thickness of the K/Na exchange layer included in the chemically toughened microcrystalline glass in the foregoing embodiments is less than or equal to 3 µm. Through control on the thickness of the K/Na exchange layer (potassium layer), the impact resistance and the fall resistance to a rough ground of the chemically toughened microcrystalline glass can be further improved. Based on the depth of compressive stress layer, the compressive stress intensity, and the relationship between the depth of compressive stress layer and the compressive stress intensity, a requirement for the thickness of the K/Na exchange layer can be effectively reduced.

On the basis that the chemically toughened microcrystalline glass in the foregoing embodiments has excellent piercing resistance to a rough ground, fall resistance, and optical performance such as light transmission, the chemically toughened microcrystalline glass may further have a high Young's modulus and high impact resistance. The chemically toughened microcrystalline glass in this embodiment of this application may be any one of chemically toughened microcrystalline glass with 2D morphology, chemically toughened microcrystalline glass with 2.5D morphology, or chemically toughened microcrystalline glass with 3D morphology. The chemically toughened microcrystalline glass has the forgoing excellent piercing resistance to a rough ground and optical performance. This expands an application scope of the chemically toughened microcrystalline glass, and improves quality and performance stability of corresponding products.

When the chemically toughened microcrystalline glass in the foregoing embodiments is the chemically toughened microcrystalline glass with 2D morphology or the chemically toughened microcrystalline glass with 2.5D morphology, in this embodiment, CS50 and Doc of the chemically toughened microcrystalline glass meet the following: CS50/(Doc−50) is 1.4 to 6.

In some other embodiments, when the thickness of the chemically toughened microcrystalline glass is less than or equal to 0.8 mm, an average transmittance of light at a wavelength of 400 nm to 940 nm is greater than or equal to 89.5%, a difference between a single-point transmittance at a wavelength of 550 nm and that at a wavelength of 400 nm is less than 1%, the absolute value of the color coordinate b is less than or equal to 0.3, and the haze is less than or equal to 0.14%.

Therefore, when the chemically toughened microcrystalline glass in the foregoing embodiments is the chemically toughened microcrystalline glass with 2D morphology or the chemically toughened microcrystalline glass with 2.5D morphology, the chemically toughened microcrystalline glass has excellent piercing resistance to a rough ground and light transmission. In addition, compared with the optical performance of the original microcrystalline glass, the optical performance such as light transmission of the chemically toughened microcrystalline glass is stable.

When the chemically toughened microcrystalline glass in the foregoing embodiments is the chemically toughened microcrystalline glass with 3D morphology, in this embodiment, a long-side bend angle of the chemically toughened microcrystalline glass with 3D morphology is 15° to 89°. In addition, CS50, Doc, and a relationship between CS50 and Doc of the chemically toughened microcrystalline glass meet the characteristics shown in the foregoing formulas 1-1 to 1-3. The chemically toughened microcrystalline glass still has excellent piercing resistance to a rough ground, and certainly still has excellent impact resistance. Measured optical characteristics of the chemically toughened microcrystalline glass are as described above: An average transmittance of light at a wavelength of 400 nm to 940 nm is greater than or equal to 89.5%, a difference between a single-point transmittance at a wavelength of 550 nm and that at a wavelength of 400 nm is less than 1%, the absolute value of the color coordinate b is less than or equal to 0.4, and the haze is less than or equal to 0.15%. Although a slight difference exists upon comparison with the optical performance of the original microcrystalline glass, the difference is not obvious. Therefore, when the chemically toughened microcrystalline glass in the foregoing embodiments is the chemically toughened microcrystalline glass with 3D morphology, the chemically toughened microcrystalline glass still has excellent optical performance such as light transmission.

According to another aspect, an embodiment of this application provides a preparation method of the foregoing chemically toughened microcrystalline glass in the embodiments of this application. As shown in FIG. 3, a process procedure of the preparation method of the chemically toughened microcrystalline glass in this embodiment of this application includes the following steps.

S01: Perform, in a sodium salt-contained bath, a primary chemical toughening treatment on original microcrystalline glass that is to undergo a chemical toughening treatment, to form a Na/Li exchange layer.

In a primary chemical toughening treatment process, sodium ions in the sodium-contained salt bath diffuse into a surface layer of the original microcrystalline glass under a thermodynamic action, and are exchanged with lithium ions in the surface layer of the original microcrystalline glass, that is, a sodium-lithium ion exchange is performed, so that the Na/Li exchange layer is formed in the surface layer of the original microcrystalline glass. In addition, through control on the primary chemical toughening treatment, the chemically toughened microcrystalline glass formed by chemical toughening can have the depth of compressive stress layer, the compressive stress intensity CS50 range, and the relationship between the depth of compressive stress layer and the compressive stress intensity CS50 range (shown in the foregoing formulas 1-1 to 1-3) of the chemically toughened microcrystalline glass in the foregoing embodiments of this application. In this way, the prepared chemically toughened microcrystalline glass is endowed with a relatively high compressive stress and a greatly improved stress intensity, can resist crack propagation, and has excellent piercing resistance to a rough ground. In addition, in this application, a chemical toughening condition for the preparation method of the chemically toughened microcrystalline glass in this application is easy to control, so that the prepared chemically toughened microcrystalline glass has stable performance, high efficiency, and reduced preparation costs.

In this embodiment, the sodium-contained salt bath includes $NaNO_3$ or a salt mixture of $NaNO_3$ and $KNO_3$. When the sodium-contained salt bath is a salt mixture including $NaNO_3$ and $KNO_3$, a content of $NaNO_3$ is greater than or equal to 50 wt % in the salt mixture of $NaNO_3$ and $KNO_3$. In this embodiment, for the primary chemical toughening treatment, a temperature is 380° C. to 450° C., and a toughening time is 0.5 h to 6 h. Through control on a type of the sodium-contained salt bath, the content of $NaNO_3$, and the primary chemical toughening treatment, an effect of the chemical toughening treatment on the original microcrystalline glass is improved, and the depth of compressive stress layer and the compressive stress intensity CS50 range of the formed chemically toughened microcrystalline glass are optimized, so that the compressive stress of the chemically toughened microcrystalline glass is increased, and piercing resistance to a rough ground and light transmission performance of the chemically toughened microcrystalline glass are improved.

In addition, the original microcrystalline glass that is to undergo a chemical toughening treatment is the original microcrystalline glass of the foregoing chemically toughened microcrystalline glass, for example, a main crystalline phase is either of lithium metasilicate and a R-quartz solid solution, a mass fraction of the contained total crystalline phase is 35% to 75%, and a total content of a secondary crystalline phase is less than 5%. In a specific embodiment, the original microcrystalline glass includes main composition and a nucleating agent. The main composition includes $SiO_2$, $Al_2O_3$, $B_2O_3$, $Li_2O$, $Na_2O$, and $K_2O$, and meets the following: a content of $SiO_2+Al_2O_3+B_2O_3$ is 58-85 mol %, and a content of $Li_2O+Na_2O+K_2O$ is 10-32 mol %. The nucleating agent includes $TiO_2$, $P_2O_5$, and $ZrO_2$, and meets the following: a content of $TiO_2+P_2O_5+ZrO_2$ is 2-8 mol %.

In this embodiment, when the prepared chemically toughened microcrystalline glass is chemically toughened microcrystalline glass with 3D morphology, before the performing, in a sodium salt-contained bath, a primary chemical toughening treatment on original microcrystalline glass that is to undergo a chemical toughening treatment, the method further includes a step of performing the following hot bending treatment on the original microcrystalline glass:

performing the hot bending treatment on the original microcrystalline glass at 650° C. to 750° C. to form 3D original microcrystalline glass, where a time for each hot bending work station is 30 s to 120 s, and a pressure for the hot bending treatment is 0.1 MPa to 0.9 MPa.

The 3D original microcrystalline glass is formed by performing the hot bending treatment on the original microcrystalline glass, so that after the primary chemical toughening treatment or a further secondary chemical toughening treatment, the chemically toughened microcrystalline glass with 3D morphology can be formed, and it is ensured that the chemically toughened microcrystalline glass with 3D morphology has a high compressive stress, excellent piercing resistance to a rough ground, and excellent light transmission performance.

In a specific embodiment, a long-side bend angle of the 3D original microcrystalline glass is 15° to 89°. In some other specific embodiments, an absolute value of a value change difference of a color coordinate b of the 3D original microcrystalline glass is less than or equal to 0.1. Through control on a condition for the foregoing hot bending treatment, the prepared 3D original microcrystalline glass has the required long-side bend angle, and has stable optical performance.

In comparison with existing microcrystalline glass such as the microcrystalline glass that is mentioned in BACKGROUND and whose main crystalline phase is petalite and lithium disilicate: A hot bending temperature of the existing microcrystalline glass whose main crystalline phase is petalite and lithium disilicate is greater than 750° C., and a size of a crystalline phase grows in a hot bending process, resulting in sharp deterioration of optical performance after 3D molding (an absolute value of a chromatic aberration b is greater than or equal to 2, and a haze is greater than or equal to 0.25%). An application requirement of a hot-bent 3D CG cover cannot be met. In contrast, the foregoing original microcrystalline glass whose main crystalline phase is either of lithium metasilicate and a β-quartz solid solution in this embodiment of this application uses a highest hot bending temperature ranging from 650° C. to 750° C. described above. Before and after the hot bending, the absolute value of the value change difference of the color coordinate b of the glass is less than or equal to 0.1, the absolute value of the color coordinate b is less than or equal to 0.4, and the haze is less than or equal to 0.14%. An application requirement of a 3D hot-bent 3D CG cover can be met.

In this embodiment, after the primary chemical toughening treatment, the method further includes step S02 shown in FIG. 3: performing, in a potassium salt-contained bath, a secondary chemical toughening treatment on the chemically toughened microcrystalline glass in which the Na/Li exchange layer is formed, to form a K/Na exchange layer.

In a secondary chemical toughening treatment process, potassium ions in the potassium-contained salt bath diffuse into the surface layer of the chemically toughened microcrystalline glass under a thermodynamic action, and are exchanged with sodium ions in the Na/Li exchange layer, that is, a potassium-sodium ion exchange is performed, and the K/Na exchange layer is formed in the surface layer of the chemically toughened microcrystalline glass, thereby further improving impact resistance and fall resistance to a rough ground of the chemically toughened microcrystalline glass.

In this embodiment, the potassium-contained salt bath includes $KNO_3$ or a salt mixture of $NaNO_3$ and $KNO_3$. When the potassium-contained salt bath is a salt mixture including $NaNO_3$ and $KNO_3$, a content of $KNO_3$ is greater than or equal to 80 wt % in the salt mixture of $NaNO_3$ and $KNO_3$. In this embodiment, for the secondary chemical toughening treatment, a temperature is 380° C. to 450° C., and a toughening time is 0.2 h to 1 h. Through control on a type of the potassium-contained salt bath, the content of $KNO_3$, and the secondary chemical toughening treatment, an effect of the secondary chemical toughening treatment is improved, and impact resistance and fall resistance to a rough ground of the chemically toughened microcrystalline glass are further improved.

In addition, the chemically toughened microcrystalline glass in the foregoing embodiments of this application and the chemically toughened microcrystalline glass prepared by using the preparation method thereof are compared with existing microcrystalline glass such as the microcrystalline glass that is mentioned in BACKGROUND and whose main crystalline phase is petalite and lithium disilicate. Because the existing microcrystalline glass whose main crystalline phase is petalite and lithium disilicate has a relatively high crystallinity (this material includes a plurality of main crystalline phases, and needs a relatively high crystallinity to maintain excellent optical performance), and needs higher potential energy for ion exchanges, a higher chemical toughening temperature/a longer chemical toughening time is required. In addition, the microcrystalline glass is sensitive to a concentration of Li in chemical toughening boiler water, requires accurate control on the concentration of Li in a chemical toughening process, and is limited by suppression by Li on Na/Li exchanges in the chemical toughening process. Therefore, for chemically toughened microcrystalline glass formed by chemically toughening the existing microcrystalline glass, CS50 is less than $130+(20 \text{ t}-13)\times15$ MPa. However, the chemically toughened microcrystalline glass in this embodiment of this application, in particular, the chemically toughened microcrystalline glass whose main crystalline phase includes either of lithium metasilicate and a β-quartz solid solution, has a relatively low crystallinity, for example, a crystallinity less than or equal to 75 wt %. The chemical toughening treatment process is not sensitive to Li. CS50, Doc, and the relationship between CS50 and Doc of the chemically toughened microcrystalline glass obtained by the chemical toughening treatment meet the characteristics shown in the foregoing formulas 1-1 to 1-3. Particularly, CS50 is from $130+(20 \text{ t}-13)\times15$ Mpa to $230+ (20 \text{ t}-13)\times15$ MPa. In this way, more excellent piercing resistance to a rough ground is obtained.

According to still another aspect, based on the foregoing chemically toughened microcrystalline glass and the preparation method thereof, an embodiment of this application provides an electronic device. The electronic device in this embodiment of this application includes a glass component, and the glass component is the chemically toughened microcrystalline glass in the forgoing embodiment of this application. In this way, because the chemically toughened microcrystalline glass in this embodiment of this application has the foregoing excellent piercing resistance to a rough ground, optical performance, and impact resistance, the glass component is endowed with excellent fall and crash resistance and high strength. Therefore, the electronic device in this embodiment of this application that includes the glass component also has excellent fall and crash resistance and impact resistance, and the electronic device has high quality and high working performance stability.

In this embodiment, the glass component of the electronic device includes at least one of a display cover, a protection cover, or a protection screen. The glass component has good light transmission and a good display effect, and can further provide good protection. In addition, the glass component has fall and crash resistance and high strength, so that the electronic device is stable. The glass component may further be any one of chemically toughened microcrystalline glass with 2D morphology, chemically toughened microcrystalline glass with 2.5D morphology, or chemically toughened microcrystalline glass with 3D morphology. This expands an application scope of the chemically toughened microcrystalline glass and improves quality and performance stability of the corresponding electronic device.

In this embodiment, the electronic device includes at least one of a communications mobile terminal, an electronic watch, a band, and a computer. In a specific embodiment, when the electronic device is a communications mobile terminal such as a mobile phone, the glass component included in the electronic device may be used as a front cover or a rear cover of the mobile phone. Because the electronic device includes the glass component, the electronic device has excellent fall resistance or further has excellent impact resistance, and has high strength, so that performance of the electronic devices is stable.

The following describes the foregoing chemically toughened microcrystalline glass and the preparation method thereof in detail with reference to specific embodiments.

Embodiment 1

This embodiment provides β-quartz solid solution based chemically toughened microcrystalline glass with 3D morphology and a chemical toughening method thereof. Related performance of the chemically toughened microcrystalline glass and related process parameters of the chemical toughening method thereof are separately described in the following Table 2.

The preparation method of the chemically toughened microcrystalline glass includes the following steps.

S1: Original microcrystalline glass and preparation thereof.

(1) A glass matrix is prepared by using a melting and casting method. Component composition of the glass matrix is as follows: $SiO_2+Al_2O_3+B_2O_{3=85}$ mol %, and $Li_2O+Na_2O+K_2O=10$ mol %. For a nucleating agent, $TiO_2+P_2O_5+ZrO_2=2$ mol %, and another component is MgO.

(2) A two-step heat treatment is performed on the prepared glass matrix to obtain a required crystalline phase. In a first heat treatment step, a temperature is 600° C., and a treatment time is 0.1 h. In a second heat treatment step, a temperature is 750° C. to 900° C., and a treatment time is 0.1 h. A main crystalline phase of obtained crystal is a β-quartz solid solution, and a crystallinity obtained through an XRD test is 35 wt %.

S2: 3D original microcrystalline glass and preparation thereof.

The β-quartz solid solution based microcrystalline glass prepared in step S1 is cut/ground/polished into a 0.35 mm thick raw glass sheet. Then, hot bending is performed by using a 3D graphite mold to form a 3D model, where a highest hot bending temperature is 650° C., a hot bending compressive stress is 0.9 MPa, and a hot bending time for a single station is 30 s.

S3: The 3D glass obtained after the hot bending in step S2 is polished on concave and convex surfaces by using a 3D polishing brush (a thickness after the polishing is 0.3 mm); and then a chemical toughening treatment is performed to form the β-quartz solid solution based chemically toughened microcrystalline glass with 3D morphology, where toughening conditions for chemical toughening are described in Table 2.

Embodiment 2

This embodiment provides lithium metasilicate based chemically toughened microcrystalline glass with 2.5D morphology and a chemical toughening method thereof. Related performance of the chemically toughened microcrystalline glass and related process parameters of the chemical toughening method thereof are separately described in the following Table 2.

The preparation method of the chemically toughened microcrystalline glass includes the following steps.

S1: Original microcrystalline glass and preparation thereof.

(1) A glass matrix is prepared by using a melting and casting method. Component composition of the glass matrix is as follows: $SiO_2+Al_2O_3+B_2O_{3=58}$ mol %, and $Li_2O+Na_2O+K_2O=32$ mol %. For a nucleating agent, $TiO_2+P_2O_5+ZrO_{2=8}$ mol %, and another component is MgO of 2 mol %.

(2) A two-step heat treatment is performed on the prepared glass matrix to obtain a required crystalline phase. In a first heat treatment step, a temperature is 500° C., and a treatment time is 10 h. In a second heat treatment step, a temperature is 640° C., and a treatment time is 10 h. A main crystalline phase of obtained crystal is lithium metasilicate, and a crystallinity obtained through an XRD test is 75 wt %.

S2: 2.5D original microcrystalline glass and preparation thereof.

The lithium metasilicate based original microcrystalline glass prepared in step S1 is cut/ground/processed by using a computer numerical control machine (Computer numerical control, CNC)/polished into a 0.65 mm carrier with 2.5D morphology.

S3: The 2.5D original microcrystalline glass in step S2 is polished on concave and convex surfaces by using a polishing brush; and then a chemical toughening treatment is performed to form the lithium metasilicate based chemically toughened microcrystalline glass with 2.5D morphology, where a thickness of a finished product is 0.6 mm, and toughening conditions for chemical toughening are described in Table 2.

Embodiment 3

This embodiment provides lithium metasilicate based chemically toughened microcrystalline glass with 3D morphology and a chemical toughening method thereof. Related performance of the chemically toughened microcrystalline glass and related process parameters of the chemical toughening method thereof are separately described in the following Table 2.

The preparation method of the chemically toughened microcrystalline glass includes the following steps.

S1: Original microcrystalline glass and preparation thereof.

(1) A glass matrix is prepared by using a melting and casting method. Component composition of the glass matrix is as follows: $SiO_2+Al_2O_3+B_2O_{3=65}$ mol %, and $Li_2O+Na_2O+K_2O=30$ mol %. For a nucleating agent, $TiO_2+P_2O_5+ZrO_{2=5}$ mol %.

(2) A two-step heat treatment is performed on the prepared glass matrix to obtain a required crystalline phase. In a first heat treatment step, a temperature is 550° C., and a treatment time is 6 h. In a second heat treatment step, a temperature is 800° C., and a treatment time is 2 h. A main crystalline phase of obtained crystal is lithium metasilicate, and a crystallinity obtained through an XRD test is 65 wt %.

S2: 3D original microcrystalline glass and preparation thereof.

The lithium metasilicate based original microcrystalline glass prepared in step S1 is cut/ground/polished into a 0.7 mm thick raw glass sheet. Then, hot bending is performed by using a 3D graphite mold to form a 3D model, where a highest hot bending temperature is 750° C., a hot bending compressive stress is 0.1 MPa, and a hot bending time for a single station is 120 s.

S3: The original microcrystalline glass in step S2 is polished on concave and convex surfaces by using a 3D polishing brush; and then a chemical toughening treatment is performed to form the lithium metasilicate based chemically toughened microcrystalline glass with 3D morphology, where a thickness of a finished product is 0.65 mm, and toughening conditions for chemical toughening are described in Table 2.

Embodiment 4

This embodiment provides lithium metasilicate based chemically toughened microcrystalline glass with 2.5D morphology and a chemical toughening method thereof. Related performance of the chemically toughened microcrystalline glass and related process parameters of the chemical toughening method thereof are separately described in the following Table 2.

The preparation method of the chemically toughened microcrystalline glass includes the following steps.

S1: Original microcrystalline glass and preparation thereof.

(1) A glass matrix is prepared by using a melting and casting method. Component composition of the glass matrix is as follows: $SiO_2+Al_2O_3+B_2O_3=65$ mol %, and $Li_2O+Na_2O+K_2O=30$ mol %. For a nucleating agent, $TiO_2+P_2O_5+ZrO_2=5$ mol %.

(2) A two-step heat treatment is performed on the prepared glass matrix to obtain a required crystalline phase. In a first heat treatment step, a temperature is 550° C., and a treatment time is 6 h. In a second heat treatment step, a temperature is 800° C., and a treatment time is 2 h. A main crystalline phase of obtained crystal is lithium metasilicate, and a crystallinity obtained through an XRD test is 65 wt %.

S2: 2.5D original microcrystalline glass and preparation thereof.

The lithium metasilicate based original microcrystalline glass prepared in step S1 is cut/ground/polished into a 1 mm thick raw glass sheet with 2.5D morphology.

S3: A chemical toughening treatment is performed on the 2.5D original microcrystalline glass in step S2, where toughening conditions for chemical toughening are described in Table 1.

Related performance tests of the chemically toughened microcrystalline glass:

Related performance tests described in the following Table 2 are separately performed based on the foregoing Embodiment 1 to Embodiment 4. Test methods are as follows. Test results are described in the following Table 1:

TABLE 1

| Test item | | Embodiment 1 | Embodiment 2 | Embodiment 3 | Embodiment 4 |
|---|---|---|---|---|---|
| Physical property | Crystallinity | 35% | 75% | 65% | 65% |
| | Young's modulus E (Gpa) | 95 | 105 | 100 | 100 |
| | Thickness (mm) | 0.3 | 0.6 | 0.65 | 1 |
| Chemical toughening process | Toughening 1 | Pure NaNO₃: 380° C./0.5 h | 50% NaNO₃ and 50% KNO₃: 450° C./6 h | Pure NaNO₃: 450° C./3 h | 80% NaNO₃ and 20% KNO₃: 450° C./2 h |

TABLE 1-continued

| Test item | | Embodiment 1 | Embodiment 2 | Embodiment 3 | Embodiment 4 |
|---|---|---|---|---|---|
| | Toughening 2 | Pure KNO$_3$: 380° C./0.2 h | / | 80% KNO$_3$ and 20% NaNO$_3$: 380° C./0.5 h | 99% KNO$_3$ and 1% NaNO$_3$: 400° C./1 h |
| Stress curve | CS50 (MPa) | 45 | 115 | 230 | 300 |
| | Depth Doc of compressive stress layer (μm) | 60 | 132 | 102 | 100 |
| | Depth of a K exchange layer (μm) (EPMA test) | 1.5 | 3 | 1.2 | 2.5 |
| | CS50/(Doc − 50) | 4.50 | 1.40 | 4.42 | 6.00 |
| Optical performance | Transmittance | 91.50% | 90.80% | 90.50% | 89.50% |
| | Transmittance difference (550 nm and 400 nm) | 0.50% | 0.90% | 1% | 0.80% |
| | Chromatic aberration \|b\| | 0.25 | 0.3 | 0.2 | 0.4 |
| | Haze (%) | 0.11 | 0.14 | 0.12 | 0.15 |
| Fall test | Mean value m of heights of grit sandpaper-based fall tests | 0.9 | 1.5 | 1.8 | 2.5 |
| Squeezing test | Size of a longest side of a shard mm | 5 | 7 | 6 | 7 |
| Environment test | High temperature and high humidity for 72 h (85° C./85% humidity) | No sodium salt is precipitated. | No sodium salt is precipitated. | No sodium salt is precipitated. | No sodium salt is precipitated. |

It can be learned from Table 1 that, in each embodiment, a depth Doc of compressive stress layer of the chemically toughened microcrystalline glass and a thickness of the chemically toughened microcrystalline glass meet the following: Doc is 0.15 t to 0.22 t. A compressive stress intensity CS50 at a toughening depth of 50 μm in a surface layer of each type of chemically toughened microcrystalline glass and the thickness of the chemically toughened microcrystalline glass meet the following: CS50 is 130+(20 t−13)×15 Mpa to 230+(20 t−13)×15 MPa. CS50 and Doc meet the following relationship: CS50/(Doc−50) is 1 to 7.5. In addition, the chemically toughened microcrystalline glass has high piercing resistance to a rough ground, excellent optical performance such as light transmission, and good stability of heat and humidity resistance.

Further, existing 0.6 mm thick primary-toughened aluminosilicate glass (with a K/Na exchange) and 0.6 mm thick secondary-toughened lithium aluminosilicate glass (with both K/Na and Na/Li exchanges) in the industry are used as examples for comparison with chemically toughened microcrystalline glass obtained by using original microcrystalline glass and a chemical toughening treatment that are same as those in Embodiment 3, so as to perform CS50 (MPa) tests and 180 #grit sandpaper-based fall height tests on these three types of glass. The primary-toughened aluminosilicate glass, the secondary-toughened lithium aluminosilicate glass, and the chemically toughened microcrystalline glass in this embodiment of this application have same morphology and a same thickness. Test results are described in Table 2.

TABLE 2

| Glass type | Ion exchange mode | CS50 (MPa) | Height of a grit sandpaper-based fall test (m) |
|---|---|---|---|
| Primary-toughened aluminosilicate glass | K/Na exchange | 0 | 0.3-0.4 |
| Secondary-toughened lithium aluminosilicate glass | Na/Li exchange + K/Na exchange | 60-110 | 0.5-1 |
| Chemically toughened microcrystalline glass in this embodiment of this application | Na/Li exchange + K/Na exchange | 230 | 1.8 |

It can be learned from Table 2 that, CS50 and the height of the grit sandpaper-based fall test for the chemically toughened microcrystalline glass in this embodiment of this application are significantly higher than CS50 and the height of the grit sandpaper-based fall test for the existing primary-toughened aluminosilicate glass and the secondary-toughened lithium aluminosilicate glass. Therefore, piercing resistance to a rough ground of the chemically toughened microcrystalline glass in this embodiment of this application is significantly improved. Therefore, the chemically toughened microcrystalline glass provided in this embodiment of this application is used in an electronic product. For example, the glass is used as a front cover or a rear cover of a mobile phone, and may be specifically a 2D cover, a 2.5D cover, a 3D cover, or the like, so as to improve fall resistance of the mobile phone and other electronic products, and endow the corresponding electronic product with excellent crash resistance. The glass can further improve impact resistance of the mobile phone and other electronic products, to make performance of the electronic product stable.

The foregoing descriptions are merely example embodiments of this application, and are not used to limit this application. Any modification, equivalent replacement, or improvement made in the spirit and principle of this application shall fall within the protection scope of this application.

What is claimed is:

1. A chemically toughened microcrystalline glass, comprising:

a Na/Li exchange layer;

wherein a depth Doc of a compressive stress layer of the chemically toughened microcrystalline glass is 0.15 t to 0.22 t;

wherein a compressive stress intensity CS50 at a toughening depth of 50 μm in a surface layer of the chemically toughened microcrystalline glass is 130+ (20 t−13)×15 MPa to 230+ (20 t−13)×15 MPa;

wherein CS50 and Doc meet the following: CS50/(Doc− 50) is 1.4 to 6, in a unit of MPa/μm;

wherein t is a total thickness of the chemically toughened microcrystalline glass in a unit of mm; and wherein the surface layer of the chemically toughened microcrystalline glass further has a K/Na exchange layer; and a thickness of the K/Na exchange layer is less than or equal to 3 μm.

2. The chemically toughened microcrystalline glass according to claim 1, wherein:

when the chemically toughened microcrystalline glass is squeezed by a metal compression bar with a 10 mm diameter round head and is crushed, an average size of longest sides of shards is greater than or equal to 5 mm.

3. The chemically toughened microcrystalline glass according to claim 1, wherein a main crystalline phase of original microcrystalline glass that is used to form the chemically toughened microcrystalline glass is either of lithium metasilicate or a β-quartz solid solution.

4. The chemically toughened microcrystalline glass according to claim 3, wherein:

the microcrystalline glass prior to being chemically toughened comprises a main composition and a nucleating agent;

the main composition comprises $SiO_2$, $Al_2O_3$, $B_2O_3$, $Li_2O$, $Na_2O$, and $K_2O$, and meets the following: a content of $SiO_2+Al_2O_3+B_2O_3$ is 58-85 mol %, and a content of $Li_2O+Na_2O+K_2O$ is 10-32 mol %; and the nucleating agent comprises $TiO_2$, $P_2O_5$, and $ZrO_2$, and meets the following: a content of $TiO_2+P_2O_5+ZrO_2$ is 2-8 mol %.

5. The chemically toughened microcrystalline glass according to claim 3, wherein a glass matrix of the original microcrystalline glass is prepared by using a melting and casting method or a calendering method; and/or wherein the glass matrix of the original microcrystalline glass is heat-treated in the following two steps:

heat treatment step 1: a temperature is 500° C. to 600° C., and a treatment time is 0.1 h to 10 h; and heat treatment step 2: a temperature is 640° C. to 800° C., and a treatment time is 0.1 h to 10 h.

6. The chemically toughened microcrystalline glass according to claim 1, wherein a Young's modulus of the chemically toughened microcrystalline glass is greater than or equal to 95 GPa.

7. The chemically toughened microcrystalline glass according to claim 1, wherein the chemically toughened microcrystalline glass is any one of: chemically toughened microcrystalline glass with 2D morphology, chemically toughened microcrystalline glass with 2.5D morphology, or chemically toughened microcrystalline glass with 3D morphology.

8. The chemically toughened microcrystalline glass according to claim 7, wherein the chemically toughened microcrystalline glass is the chemically toughened microcrystalline glass with 2D morphology and/or the chemically toughened microcrystalline glass with 2.5D morphology, and an absolute value of a color coordinate b is less than or equal to 0.3 and a haze is less than or equal to 0.14% for the chemically toughened microcrystalline glass with 2D morphology and/or the chemically toughened microcrystalline glass with 2.5D morphology.

9. The chemically toughened microcrystalline glass according to claim 7, wherein the chemically toughened microcrystalline glass is the chemically toughened microcrystalline glass with 3D morphology, and a long-side bend angle of the chemically toughened microcrystalline glass with 3D morphology is 15° to 89°; and/or wherein an absolute value of a color coordinate b is less than or equal to 0.4 and a haze is less than or equal to 0.15% for the chemically toughened microcrystalline glass with 3D morphology.

10. An electronic device, comprising:

a glass component, wherein the glass component is a chemically toughened microcrystalline glass;

wherein the chemically toughened microcrystalline glass comprises a Na/Li exchange layer;

wherein a depth Doc of a compressive stress layer of the chemically toughened microcrystalline glass is 0.15 t to 0.22 t;

wherein a compressive stress intensity CS50 at a toughening depth of 50 μm in a surface layer of the chemically toughened microcrystalline glass is 130+(20 t−13)×15 MPa to 230+(20 t−13)×15 MPa;

wherein CS50 and Doc meet the following: CS50/(Doc− 50) is 1.4 to 6, in a unit of MPa/μm;

wherein t is a total thickness of the chemically toughened microcrystalline glass in a unit of mm; and wherein the surface layer of the chemically toughened microcrystalline glass further has a K/Na exchange layer; and a thickness of the K/Na exchange layer is less than or equal to 3 μm.

11. The chemically toughened microcrystalline glass according to claim 1, wherein a value of t is 0.3 mm to 0.8 mm.

12. The chemically toughened microcrystalline glass according to claim 3, wherein a mass fraction of the contained total crystalline phase is 35% to 75%.

13. The chemically toughened microcrystalline glass according to claim 12, wherein a total content of a secondary crystalline phase is less than 5%.

14. The chemically toughened microcrystalline glass according to claim 1, wherein:

when a thickness of the chemically toughened microcrystalline glass is 0.6 mm, a height of a grit sandpaper-based fall test for the chemically toughened microcrystalline glass is greater than or equal to 1.5 m.

15. The chemically toughened microcrystalline glass according to claim 1, wherein:

when the chemically toughened microcrystalline glass is stored in an environment with a temperature of 85° C. and humidity of 85% for 72 h, no sodium salt is precipitated on an outer surface of the chemically toughened microcrystalline glass.

16. The chemically toughened microcrystalline glass according to claim 1, wherein:

when the thickness of the chemically toughened microcrystalline glass is less than or equal to 0.8 mm, an average transmittance of light at a wavelength of 400 nm to 940 nm is greater than or equal to 89.5%.

17. The chemically toughened microcrystalline glass according to claim 1, wherein:

when the thickness of the chemically toughened microcrystalline glass is less than or equal to 0.8 mm, a difference between a single-point transmittance at a wavelength of 550 nm and that at a wavelength of 400 nm is less than 1%.

18. The chemically toughened microcrystalline glass according to claim 1, wherein:

when the thickness of the chemically toughened microcrystalline glass is less than or equal to 0.8 mm, an absolute value of a color coordinate b is less than or equal to 0.4.

19. The electronic device according to claim 10, wherein:

when the thickness of the chemically toughened microcrystalline glass is less than or equal to 0.8 mm, an average transmittance of light at a wavelength of 400 nm to 940 nm is greater than or equal to 89.5%.

20. The electronic device according to claim 10, wherein a Young's modulus of the chemically toughened microcrystalline glass is greater than or equal to 95 GPa.

* * * * *